United States Patent [19]
Löb et al.

[11] 4,009,296
[45] Feb. 22, 1977

[54] METHOD FOR PRODUCING THE INSULATION OF A CONDUCTOR BUNDLE

[75] Inventors: Georg Löb; Clemens Pföhler, both of Eberbach, Germany

[73] Assignee: Brown, Boveri & Cie. A.G., Mannheim, Germany

[22] Filed: Mar. 10, 1975

[21] Appl. No.: 556,925

[30] Foreign Application Priority Data

Mar. 12, 1974 Germany .................... 7408585[U]

[52] U.S. Cl. .................................. 427/54; 156/48; 156/272; 156/305; 427/58; 427/435

[51] Int. Cl.² ...................... H01B 13/00; C09J 5/00

[58] Field of Search ................ 156/47, 48, 51, 145, 156/180, 181, 305, 324, 272; 174/110 N, 110 E, 117 F, 117 FF, 27; 427/117, 120, 388, 434, 435, 54

[56] References Cited

UNITED STATES PATENTS

| | | | |
|---|---|---|---|
| 1,999,137 | 4/1935 | Fewelling | 174/117 FF |
| 2,122,463 | 7/1938 | Fuller | 427/120 |
| 3,537,927 | 11/1970 | Anderson et al. | 156/47 |
| 3,620,886 | 11/1971 | Sims et al. | 156/272 |
| 3,662,088 | 5/1972 | Wright et al. | 427/120 |
| 3,672,974 | 6/1972 | Tomlinson | 156/48 |

FOREIGN PATENTS OR APPLICATIONS

| | | | |
|---|---|---|---|
| 45-2945 | 1/1970 | Japan | 427/120 |

*Primary Examiner*—Douglas J. Drummond
*Attorney, Agent, or Firm*—Herbert L. Lerner

[57] ABSTRACT

Method of producing the insulation of a conductor bundle having a plurality of metallic conductors spaced one from another which includes immersing the conductor bundle into a mass of insulating material heated to liquid state, and withdrawing the conductor bundle coated with liquid insulating material out of the mass of liquid insulating material at a speed that is slower than the speed at which the liquid insulating mass drips from the conductor bundle; and device for performing the foregoing method.

9 Claims, 5 Drawing Figures

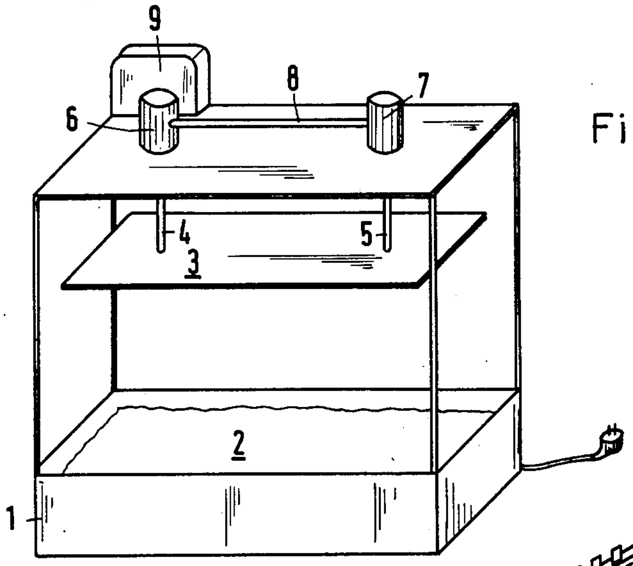
Fig.1
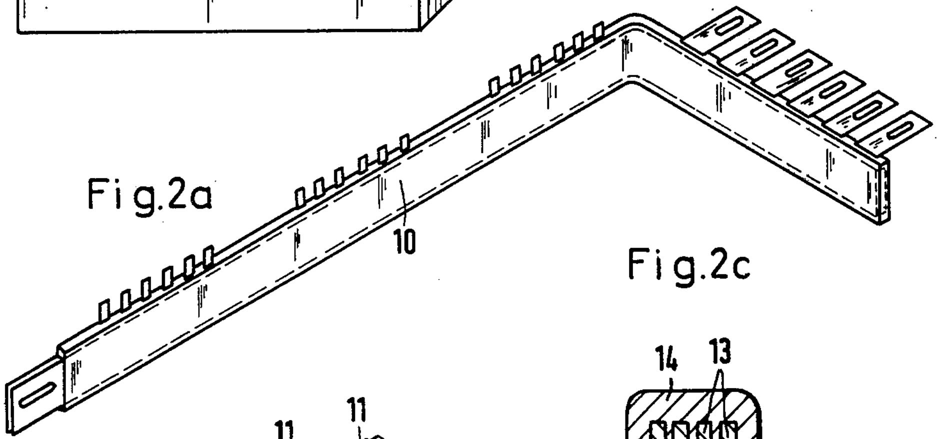
Fig.2a
Fig.2c
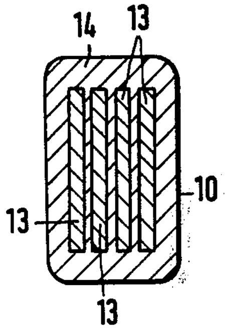
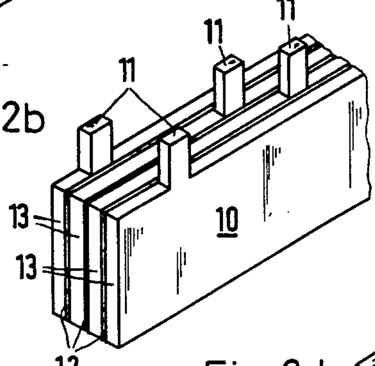
Fig 2b
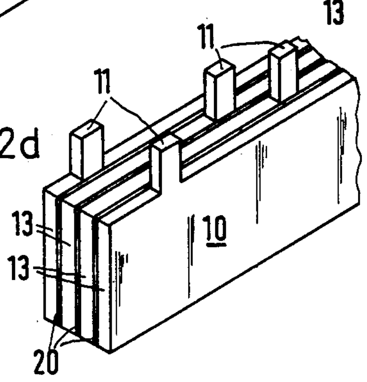
Fig.2d

METHOD FOR PRODUCING THE INSULATION OF A CONDUCTOR BUNDLE

The invention relates to a method for producing the insulatin of a conductor bundle, especially relatively flat conductor bundles, which are made up of a plurality of metallic conductors that are held spaced one from another.

It has been known heretofore to insulate the conductors of conductor bundles or cable trunks individually with respect to one another and to cover them individually with foil of plastic material and, in order to prevent the penetration of moisture into the interior of the conductor bundle, the side of the conductor bundle, from which the terminal fins of the respective conductors are visible, as well as the ends and the underside thereof are coated with a hardening mass of molding material. The production of the conductor bundle in this manner demands great technical outlay and many operational phases or cycles. Accordingly it is an object of the invention to provide a method of the aforementioned type, by means of which conductor bundles are producible with the same quality at minimal technical outlay.

It is a more specific object of the invention, to provide such a method wherein the outer surfaces of a cable trunk or conductor bundle produced therein is always uniformly smooth, the thickness of the covering insulating layer being equal at all locations thereof.

With the foregoing and other objects in view, there is provided, in accordance with the invention, a method of producing the insulation of a conductor bundle having a plurality of metallic conductors spaced one from another which comprises immersing the conductor bundle into a mass of insulating material heated to liquid state, and withdrawing the conductor bundle coated with liquid insulating material out of the mass of liquid insulating material at a speed that is slower than the speed at which the liquid insulating mass drips from the conductor bundle.

Due to the fact that the speed at which the conductor bundle is withdrawn from the insulating mass is slower than that at which the liquid insulating mass drips from the conductor bundle, the formation of locations of thicker insulating layer at the outside of a conductor bundle is avoided.

In accordance with other features of the invention, the insulating mass is a thermoplastic synthetic material, for example, a polyamide resin, which is colorable by adding a dye thereto.

In accordance with further features of the invention, instead of being formed of polyamide resin the insulating mass consists of a flame-resistant slowly hardening epoxy resin having a hardening period that is reducible by thermal radiation, ultraviolet radiation, and the like.

Other features which are considered as characteristic for the invention are set forth in the appended claims.

Although the invention is illustrated and described herein as embodied in a method for producing the insulation of a conductor bundle and device for performing the method, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is a perspective view of apparatus for insulating conductor bundles in accordance with the method of the invention;

FIG. 2*a* is a perspective view of a conductor bundle insulated by means of the apparatus of FIG. 1 in accordance with the method of the invention;

FIG. 2*b* is a fragmentary perspective view of one embodiment of a conductor bundle to be insulated by means of the apparatus of FIG. 1;

FIG. 2*c* is a cross-sectional view of a conductor bundle such as that of FIG. 2*b* after it has been insulated by the apparatus of FIG. 1; and FIG. 2*d* is a view similar to that of FIG. 2*b* of another embodiment of a conductor bundle to be insulated by the apparatus of FIG. 1.

Referring now to the drawing and first, particularly, to FIG. 1 thereof, there is shown apparatus for carrying out the method of producing insulation of a conductor bundle, according to the invention, which includes a vessel 1 in which insulating mass 2 is received. The vessel 1 is heatable electrically, as suggested by the live cord and plug at the lower right-hand side of FIG. 1, and heats the insulating mass 2 up to a given temperature at which it has a specific viscosity. A platform 3 is secured above the vessel 1 by two spindles 4 and 5 which are driven by an electric motor 9 through transmissions 6 and 7, having an adjustable transmission ratio and a coupling shaft 8 extending between the transmissions 6 and 7. The spacing between the vessel 1 and the platform 3 is adjustable. A conventional control device, not shown in FIG. 1, is suitably associated with the electric motor 9 for adjusting the speed at which the platform 3 travels downwardly toward or upwardly away from the surface of the insulating mass 2. In FIG. 2*a*, there is shown a conductor bundle 10, also referred to herein as cable trunk, a plurality of which are suspended from the platform 3 and immersed in the insulating mass 2 and then gradually withdrawn from the insulating mass 2. The speed at which the cable trunks or conductor bundles are withdrawn from the molten insulating mass 2 should be less than the viscosity-dependent speed at which the insulating mass 2 drips from the withdrawn cable booms or conductor bundles 10. The withdrawing speed is reducible to a value of 0.1 mm/sec. Before it is immersed in the insulating mass 2, the cable trunk or conductor bundle 10 is cleaned of any fat or grease that may appear thereon so that all locations thereof will be uniformly coated with the insulating mass 2, and the formation of air bubbles in the coating will be avoided. Advantageously, a polyamide resin can be used as the insulating mass 2, which is heated in the vessel 1 and which permits the thus insulation-coated cable boom or conductor bundle 10 to be touched by hand after one minute has passed. This polyamide resin can be colored at will with suitable conventional dye stuffs. On the other hand, it is also possible to use slowly hardening epoxy resin for the insulating mass 2, the hardening period of the epoxy resin being shortened due to irradiation by thermal or ultraviolet radiating devices or the like.

In FIG. 2*b*, there is shown a section of a cable trunk or conductor bundle 10 which is made up of four copper conductors 13 which are separated one from the other by an insulating medium 12. In the specific embodiment of FIG. 2*b*, the insulating medium 12 is a polyethylene foil which is inserted between the individual conductors 13. Naturally, it is also possible to use a foil of different material, it being only required that the foil have insulating properties. The cable trunk or conductor bundle 10 of FIG. 2*b* is secured by the terminal fins 11 thereof by any suitable manner to the platform 3, immersed in the liquid insulating mass 2 and then withdrawn therefrom. After one minute, the insulated cable boom or conductor bundle 10 can be removed from the platform so that it is surrounded on all sides thereof by the insulating mass 2.

It is also possible to pack the conductors 13 in such a manner that an air gap forms between the individual conductors 13. Thus, when the bundle or boom 10 is immersed in the insulating mass 2, the air gaps are filled with insulating material so that the conductors 13 need not any longer be initially insulated one from the other by an insulation such as polyethylene foil, for example. Thus, the metallic conductors 13 of the cable bundle 10 are spaced one from another by insulating spacer members 20 (FIG. 2*d*) of such dimensions that the liquid insulating mass is held by capillary forces between the conductors 13. Several operational cycles or phases are thereby saved or spaced. In addition, the insulating mass penetrating into the gaps between the conductors 13 increases the mechanical strength or rigidity of the entire cable trunk or conductor bundle 10.

In FIG. 2*c*, there is shown in cross section, a cable trunk or conductor bundle 10. The insulating mass 2 (FIG. 1) has been firmly applied to and between the conductors 13 and forms a mechanically stable and insulating covering which is protective against climatic influences.

We claim:

1. Method of producing the insulation of a conductor bundle having a plurality of flat metallic conductors spaced one from another which comprises immersing the conductor bundle of mutually spaced-apart uninsulated flat metallic conductors through an unobstructed path into a mass of insulating material heated to liquid state, and withdrawing the conductor bundle with each of the flat metallic conductors thereof coated at least partly with liquid insulating material through an unobstructed path out of the mass of liquid insulating material at a speed that is slower than the speed at which the liquid insulating mass drips from the conductor bundle.

2. Method according to claim 1 wherein the insulating mass is a thermoplastic synthetic material.

3. Method according to claim 2 wherein the thermoplastic synthetic material is formed of polyamide resin.

4. Method according to claim 1 wherein the insulating mass is a flame-resistant, slowly hardening epoxy resin having a hardening period that is reducible by radiation consisting of thermal or ultraviolet radiation; and which further comprises irradiating the insulating material with said radiation for reducing the hardening period thereof.

5. Method according to claim 1 which includes adding a dye to the insulating mass so as to color it.

6. Method according to claim 1 which includes, prior to immersing the conductor bundle into the liquid mass of insulating material, placing foils of insulating material between the metallic conductors of the conductor bundle so as to maintain the spacing therebetween.

7. Method according to claim 1 which includes, prior to immersing the conductor bundle into the liquid mass of insulating material, placing spacer members formed of insulating material between the respective adjacent metallic conductors of the conductor bundle, the spacer members being of such dimensions that in the subsequent immersion of the bundle with the thus spaced-apart metallic conductors into the liquid mass of insulating material, liquid insulating material will flow between the metallic conductors due to capillary forces.

8. Method according to claim 1 which includes immersing the conductor bundle into the insulating mass in a downward direction through the top of the mass and removing it upwardly out of the top of the mass.

9. Method according to claim 1 which includes immersing the entire conductor bundle except for the contacts thereof, into the insulating mass.

* * * * *